United States Patent [19]

Gehrke et al.

[11] 4,029,680

[45] June 14, 1977

[54] PROCESS FOR THE PREPARATION OF DIAMINO-DIHYDROXY ANTHRAQUINONE DISPERSE DYESTUFFS

[75] Inventors: Günter Gehrke, Cologne; Reinold Schmitz, Blecher, both of Germany

[73] Assignee: Bayer Aktiengesellschaft, Leverkusen, Germany

[22] Filed: July 25, 1975

[21] Appl. No.: 599,017

[30] Foreign Application Priority Data

Aug. 3, 1974 Germany .......................... 2437523

[52] U.S. Cl. .............................................. 260/380
[51] Int. Cl.$^2$ ........................................ C07C 97/26
[58] Field of Search ........................... 260/380, 383

[56] References Cited

UNITED STATES PATENTS

| 1,845,623 | 2/1932 | Prager et al. ............... 260/383 |
| 2,487,110 | 11/1949 | Deinet et al. ............... 260/380 |
| 2,990,413 | 6/1961 | Gehrke ....................... 260/380 |
| 3,378,572 | 4/1968 | Wilder ........................ 260/384 |
| 3,636,008 | 1/1972 | Yamada et al. ............ 260/383 X |

FOREIGN PATENTS OR APPLICATIONS

| 692,314 | 8/1964 | Canada ....................... 260/383 |
| 1,577,033 | 4/1969 | France ........................ 260/384 |
| 102,532 | 3/1899 | Germany |
| 137,782 | 12/1902 | Germany |
| 3,942/63 | 7/1961 | Japan .......................... 260/380 |
| 13,029 | 9/1893 | United Kingdom ........ 260/383 |
| 323,400 | 2/1972 | U.S.S.R. ..................... 260/384 |
| 308,998 | 9/1971 | U.S.S.R. ..................... 260/384 |

Primary Examiner—Daniel E. Wyman
Assistant Examiner—Thomas A. Waltz
Attorney, Agent, or Firm—Plumley and Tyner

[57] ABSTRACT

The invention relates to the preparation of anthraquinone disperse dyestuffs from aqueous solutions containing anthraquinone-sulphonic acid mixtures, especially from appropriate waste waters by treating such solutions with chloric acid/hydrochloric acid or their salts or activated halogene, isolating the halogenoanthraquinones thereby obtained, subjecting them to dinitration and warming the dinitrohalogenoanthraquinones thus obtained with elementary sulphur in sulphuric acid optionally in the presence of boric acid. The reaction products are β-halogenated diaminodihydroxyanthraquinones which are suitable for the dyeing of polyesters and polyamides in blue shades with good fastness properties.

13 Claims, No Drawings

PROCESS FOR THE PREPARATION OF DIAMINO-DIHYDROXY ANTHRAQUINONE DISPERSE DYESTUFFS

The present invention relates to a process for the preparation of blue anthraquinone disperse dyestuffs from aqueous solutions containing anthraquinonesulphonic acid mixtures, especially from waste waters which arise from the sulphonation of anthraquinone.

It is known that the anthraquinonesulfphonic acids are the key compounds of anthraquinone chemistry. The vast majority of the anthraquinone compounds can be traced back to the sulphonic acids (compare Ullmann's Enzyklopaedie der technischen Chemie (Ullmann's Encyclopaedia of Industrial Chemistry), 4th edition, volume 7, page 586). As a rule, these sulphonic acids are obtained by sulphonation of anthraquinone (compare ibid. and J. Houben "Das Anthracen und die Anthrachinone" ("Anthracene and the Anthraquinones"), page 289 (Georg Thieme Verlag (1929)).

However, hitherto the anthraquinonesulphonic acids have only been isolated in amounts of up to 65–70% from the reaction mixtures resulting from these sulphonations.

Bearing in mind the very large quantitites of anthraquinonesulphonic acids which are manufactured world-wide, this not only means a considerable loss of anthraquinone but also a severe contamination of the waste waters.

It was therefore the task of the present invention to free the waste waters from the anthraquinonesulphonic acids with minimum possible effort and to utilise profitably the products which necessarily are obtained thereby.

According to the invention, this task is solved by a method wherein aqueous solutions of anthraquinonesulphonic acid mixtures are a) treated with chloric acid/hydrochloric acid or their salts, activated chlorine and/or bromine, b) the sparingly soluble halogenoanthraquinone compounds thereby obtained are isolated and subjected to dinitration, c) the dinitrohalogenoanthraquinones thus obtained are warmed with elementary sulphur in sulphuric acid having an $SO_3$ content of 0 to 20%, if appropriate in the presence of boric acid and d) if desired, the reaction product is post-halogenated.

The process according to the invention is particularly suitable for working up those mother liquors which arise in the α-disulphonation of anthraquinone — carried out, as is known, in the presence of mercury — after isolating the two main products (1,5- and 1,8-disulphonic acid).

Such mother liquors in general have the following composition (relative to organic solids content):

25–35% of anthraquinone-1,5-disulphonic acid
25–35% of anthraquinone-1,6-disulphonic acid
25–35% of anthraquinone-1,7-disulphonic acid
5–15% of anthraquinone-1,8-disulphonic acid.

The new process can also be used with good success in the case of mother liquors which arise from the α-disulphonation of anthraquinone after only isolating the more sparingly soluble 1,5-disulphonic acid. These mother liquors in general have the following composition (relative to organic solids content):

15–25% of anthraquinone-1,5-disulphonic acid
15–25% of anthraquinone-1,6-disulphonic acid
15–25% of anthraquinone-1,7-disulphonic acid
35–45% of anthraquinone-1,8-disulphonic acid.

Where the object of the α-disulphonation is not the preparation of the pure isomer fractions it is, of course, also possible to subject the entire disulphonation batch, that is to say without first isolating a fraction, to the "Fischer treatment." Such a batch in general has the following composition:

40–50% of anthraquinone-1,5-disulphonic acid
10–20% of anthraquinone-1,6-disulphonic acid
10–20% of anthraquinone-1,7-disulphonic acid
25–35% of anthraquinone-1,8-disulphonic acid.

A further preferred process variant is to employ mother liquors which are produced on α-monosulphonation of anthraquinone after isolating anthraquinone-1-sulphonic acid and which have approximately the following composition (relative to organic solids content):

20–30% of anthraquinone-1-sulphonic acid
25–35% of anthraquinone-2-sulphonic acid
15–20% of anthraquinone-1,5-disulphonic acid
2–8% of anthraquinone-1,6-disulphonic acid
2–8% of anthraquinone-1,7-disulphonic acid
15–20% of anthraquinone-1,8-disulphonic acid.

(All the abovementioned percentages are percent by weight).

It is advantageous to use those mother liquors of the α-sulphonation from which the mercury has first been removed in a manner which is in itself known (compare DOS (German Published Specification) 2,124,261 and DOS (German Published Specification) 2,163,674).

The individual operations a) to d) which are to be carried out in accordance with the process claimed are — taken individually — in themselves known.

The halogenation according to a), also referred to in expert circles as "Fischer treatment" (compare the above-mentioned Ullmann's Enzyklopaedie (Ullmann's Encyclopaedia), page 589 and German Patent Specification 205,195) is advantageously carried out by introducing alkali metal chlorates, preferably sodium chlorate, into the hot solution of the sulphonic acids in hydrochloric acid.

In addition, the Fischer treatment can also be carried out by passing chlorine into the mixture with simultaneous UV irradiation, or by reaction with elementary bromine.

The hydrochloric acid medium can be obtained by adding hydrochloric acid; alternatively, the hydrochloric acid has been produced — say in the case of the waste waters containing sulphuric acid, which are to be used preferentially — from the salts, such as KCl and NaCl, which have been added to precipitate the sulphonic acids.

The dinitration of the Fischer treatment products according to b) can also be carried out in the usual manner (compare, for example, German Patent Specification 137,782), for example in concentrated nitric acid or by means of nitrosulphuric acid in concentrated sulphuric acid or oleum at temperatures of 0° to 100° C, preferably 20°–50° C.

The reaction of the dinitrohalogenoanthraquinones, thus obtained, with sulphur/sulphuric acid according to c) is also known in principle (compare, for example, U.S. Pat. No. 1,845,623), but under the conditions described there, wool dyestuffs of the Anthracene Blue series are obtained. Advantageously, this reaction is carried out in the presence of boric acid in concentrated sulphuric acid having a maximum $SO_3$ content of 20%, at temperatures of 70°–170° C. In general, 1–6 mols of sulphur powder, preferably 3–4 mols of sulphur powder, are added per mol of dinitro compound. The reaction time is about 1 to 10 hours.

The reaction product thereby produced consists of diaminodihydroxyanthraquinone derivatives which in part are halogenated in the β-position. In the reaction according to d), halogen in the α-position is split off by hydrolysis and can in part re-enter in the β-position.

The dyestuffs obtained from the waste waters from the α-sulphonation, which are preferred for processing, consist mainly of 4,8-diamino-1,5-dihydroxyanthraquinone and 4,5-diamino-1,8-dihydroxyanthraquinone as well as their halogen derivatives. If desired, the halogen content of these reaction products can be increased further by customary posthalogenation methods. Preferably, 0.5 to 1,5 atoms of halogen are introduced per mol of dyestuff.

Possible halogenating agents are chlorine, sulphuryl chloride, chlorosulphonic acid and, above all, bromine.

The halogenation temperatures are 10° to 100° C, preferably 50° to 80° C.

Suitably, the post-halogenation is carried out in the sulphur/sulphuric acid batch, that is to say without prior intermediate isolation.

The dyestuffs obtained according to the invention from a waste product are outstandingly suitable for dyeing synthetic fibre materials, especially polyester, polyamide and cellulose triacetate fibres, which are dyed in blue shades having good general fastness properties.

The process according to the invention will be explained in more detail with the aid of the examples which follow, wherein "parts" in general denote "parts by weight".

EXAMPLE 1

700 parts by volume of a mother liquor arising from the industrial α-disulphonation of anthraquinone after isolating the 1,5-disulphonic acid and 1,8-disulphonic acid and removing catalyst residues are heated to 100°–105° C and an aqueous sodium chlorate solution is added over the course of 10 to 12 hours, whilst stirring, until a sample, withdrawn from time to time, filtered and rendered alkaline, no longer shows a dark brown coloration on addition of sodium dithionite (Liebermann's test). This is generally the case after adding at most 22 parts of sodium chlorate in 80 parts by volume of water. The mixture is then stirred for about 5 hours longer at 100° to 105° C. The reaction mixture is then filtered and the residue is washed with hot water until neutral. The dry yield is about 25 parts.

The dichloroanthraquinone mixture obtained shows approximately the following composition:

about 30% of 1,5-dichloroanthraquinone,
about 30% of 1,6-dichloroanthraquinone,
about 30% of 1,7-dichloroanthraquinone and
about 10% of 1,8-dichloroanthraquinone.

Other aqueous solutions of anthraquinonesulphonic acids can also be worked up analogously.

EXAMPLE 2 a. 10 parts of a dichloroanthraquinone mixture of the composition indicated in Example 1 are introduced into 75 parts of 98% strength nitric acid and the mixture is stirred for 8 hours at 40°–50° C. The reaction mixture is then poured out onto ice water and filtered. The filter residue is washed until neutral and dried. This gives about 12.5 parts of a dinitrodichloroanthraquinone mixture.

b. 10 parts of a monochloroanthraquinone and dichloroanthraquinone mixture (consisting of about 25% of 1-chloroanthraquinone and about 30% of 2-chloroanthraquinone, about 17% of 1,5-dichloroanthraquinone, about 5% of 1,6-dichloroanthraquinone, about 5% of 1,7-dichloroanthraquinone and about 17% of 1,8-dichloroanthraquinone), obtained from the mother liquor of the industrial α-monosulphonation of anthraquinone, after removing the 1-sulphonic acid by means of potassium chloride, by treatment with sodium chlorate (compare Example 1), are introduced into a mixture of 75 parts of 98% strength nitric acid and 10 parts of 96% strength sulfuric acid and stirred for 4 hours at 25° to 30° C. After working up as in Example 2a, 13.5 parts of nitration product are obtained.

c. 10 parts of a dichloroanthraquinone mixture (consisting of about 20% of 1,5-dichloroanthraquinone, about 20% of 1,6-dichloroanthraquinone, about 20% of 1,7-dichloroanthraquinone and about 40% of 1,8-dichloroanthraquinone), obtained from the mother liquor which is obtained from the industrial α-disulphonation of anthraquinone, after isolating the 1,5-disulphonic acid as the dipotassium salt and treatment with chlorate (compare Example 1), are dissolved in 100 parts of 20% strength oleum. 21 parts of nitrosulphuric acid (33% of $HNO_3$ and 67% of $H_2SO_4$) are allowed to run in over the course of 1 hour and the mixture is then stirred for a further 4 hours at 80° C. After the customary working up, 10 parts of a dinitrodichloroanthraquinone mixture are obtained.

d. A solution of anthraquinonedisulphonic acids, obtained from the sulphonation of 104 g of anthraquinone with 80 parts by volume of 20% strength oleum, 45 parts by volume of 65% strength oleum and 2 parts of mercury sulphate at 140° C, followed by dilution with 3,600 parts by volume of water, is treated, after addition of 160 parts by volume of concentrated hydrochloric acid and 280 parts by volume of concentrated sulphuric acid, with 60 parts of sodium chlorate in 250 parts by volume of water at 98° C. After stirring for a further 3 hours at this temperature, 130 parts of a dichloroanthraquinone mixture are obtained, consisting of about 45% of 1,5-dichloranthraquinone, about 15% of 1,6-dichloroanthraquinone, about 15% of 1,7-dichloroanthraquinone and about 30% of 1,8-dichloroanthraquinone. Nitration is then carried out as in Example 2a. After analogous working-up, 12.5 parts of a dinitrodichloroanthraquinone mixture are obtained.

EXAMPLE 3 a. 20 parts of a dinitrodichloroanthraquinone mixture according to Example 2a and 6 parts of sulphur are introduced into a solution of 10 parts of boric acid in 200 parts of 5% strength oleum. The reaction mixture is stirred at 150° C until a sample withdrawn from time to time and worked up in the usual manner no longer shows any changes in a chromatogram; this is the case after about 4–6 hours. After cooling to room temperature, the reaction mixture is poured onto about 2,000 parts by volume of water and the product is filtered off, washed until neutral and dried. This gives 16.5 parts of a dyestuff having a chlorine content of 10.6%, which, when used in customary dyeing processes, gives a deep blue dyeing of good fastness to light on polyester fibers.

b. 0.1 part of iodine and 8 parts of bromine are added to the above batch, before pouring out into water, at 50° C, and the mixture is further stirred after 15 hours at 80° C. After cooling, the batch is poured onto a mixture of 2,000 parts of water and 50 parts of concentrated bisulphite solution. 18 parts of a dyestuff containing 9.8% of chlorine and 9.6% of bromine are obtained, which dyes polyester fibers in a greenish-tinged blue having very good fastness to light.

EXAMPLE 4 a. 20 parts of the nitration product according to Example 2b and 8 parts of sulphur are introduced into a solution of 10 parts of boric acid in 300 parts of sulphuric acid monohydrate and the mixture is stirred at 160° C until no further change is shown by a worked-up sample.

After working up as in Example 3a, 16 parts of a dyestuff containing 8.0% of chlorine are obtained, which gives reddish-tinged blue dyeings, with good general fastness properties, on polyester, polyamide or cellulose triacetate fibers.

b. Before pouring out into water, chlorine is passed into the above batch, after addition of 0.1 part of iodine, for about 2 hours at 25° C, until a worked-up sample contains about 15% of chlorine.

After working up as in Example 3b, 17 parts of a dyestuff which gives blue dyeings having good general fastness properties on polyester fibers are obtained.

EXAMPLE 5 a. 20 parts of dinitrodichloroanthraquinone mixture according to Example 2c and 7 parts of sulphur are introduced into a solution of 10 parts of boric acid in 180 parts of 10%. strength oleum. The batch is stirred at 130° C until a worked-up sample no longer shows a change in the chromatogram.

After working up as in Example 3a, 16.2 parts of a dyestuff containing 11.8% of chlorine are obtained, which gives clear blue dyeings on polyester fibers.

b. 0.1 part of iodine and 12 parts of bromine are added to the above batch, before pouring out into water, at 50° C, and the mixture is stirred for a further 20 hours at 80° C.

After working up as in Example 3b, 18.4 parts of a dyestuff containing 10.7% of chlorine and 14.8% of bromine are obtained; this dyestuff gives greenish-tinged blue dyeings, of good fastness to sublimation, on polyester fibers.

EXAMPLE 6

20 parts of dinitrodichloroanthraquinone mixture according to Example 2d and 8 parts of sulphur are introduced into a solution of 10 parts of boric acid in 180 parts of 20% strength oleum. The batch is stirred at 100°–110° C until a worked-up sample no longer shows a change in the chromatogram.

After working up as in Example 3a, 16.1 parts of a dyestuff containing 11.2% of chlorine are obtained, which gives clear blue dyeings, of good fastness to light, on polyester fibers.

We claim:

1. Process for the preparation of anthraquinone disperse dyestuffs from aqueous solutions containing anthraquinone sulfonic acid mixtures comprising
   a. treating anthraquinone sulfonic acid waste waters arising from the sulfonation of anthraquinone by the Fischer treatment comprising halogenation with bromine or activated chlorine to form sparingly soluble halogenoanthraquinones;
   b. isolating and dinitrating the halogenoanthraquinones to form dinitro halogenoanthraquinones;
   c. warming the dinitro halogenanthraquinones with elementary sulfur in sulfuric acid having an $SO_3$ content of 0 to 20% at temperatures of from 70–170° C to obtain diaminodihydroxy anthraquinone derivatives.

2. The process of claim 1, wherein the anthraquinone sulfonic acid waste waters are treated with an alkali metal chlorate to form sparingly soluble halogenoanthraquinones.

3. The process of claim 1, wherein the anthraquinone sulfonic acid waste waters are treated with elementary bromine to form sparingly soluble halogenoanthraquinones.

4. The process of claim 1, wherein the anthraquinone sulfonic acid waste waters are treated by passing chlorine into the waste waters with simultaneous UV irradiation.

5. Process according to claim 1, characterised in that it starts from mother liquors such as arise from the industrial α-disulphonation, after isolating the anthraquinone-1,5-disulphonic acid and anthraquinone-1,8-disulphonic acid by fractional crystallisation.

6. Process according to claim 1, characterised in that it starts from mother liquors such as rise from the industrial α-monosulphonation, after isolating the anthraquinone-1-sulphonic acid.

7. Process according to claim 1, characterised in that it starts from aqueous solutions containing anthraquinonesulphonic acid, of the following composition:

25–35% of anthraquinone-1,5-disulphonic acid
25–35% of anthraquinone-1,6-disulphonic acid
25–35% of anthraquinone-1,7-disulphonic acid
5–15% of anthraquinone-1,8-disulphonic acid.

8. Process according to claim 1, characterised in that it starts from aqueous solutions, containing anthraquinonesulphonic acid, of the following composition:

20–30% of anthraquinone-1-sulphonic acid
25–35% of anthraquinone-2-sulphonic acid
15–20% of anthraquinone-1,5-disulphonic acid
2–8% of anthraquinone-1,6-disulphonic acid
2–8% of anthraquinone-1,7-disulphonic acid
15–20% of anthraquinone-1,8-disulphonic acid 9. Process according to claim 1, characterised in that it starts from aqueous solutions, containing anthraquinonesulphonic acid, of the following composition:

15–25% of anthraquinone-1,5-disulphonic acid
15–25% of anthraquinone-1,6-disulphonic acid
15–25% of anthraquinone-1,7-disulphonic acid
35–45% of anthraquinone-1,8-disulphonic acid.

10. Process according to claim 1, characterised in that it starts from aqueous solutions, containing anthraquinonesulphonic acid, of the following operation:

40–50% of anthraquinone-1,5-disulphonic acid

10–20% of anthraquinone-1,6-disulphonic acid

10–20% of anthraquinone-1,7-disulphonic acid

25–35% of anthraquinone-1,8-disulphonic acid.

11. The process of claim 1 wherein the anthraquinone sulfonic acid waste waters are treated with a system comprising chloric acid and hydrochloric acid to form sparingly soluble halogenoanthraquinones.

12. The process of claim 5 wherein the dinitrohalogenoanthraquinones are warmed with elementary sulfur in sulfuric acid in the presence of boric acid.

13. The process of claim 6 wherein the diaminodihydroxyanthraquinone reaction product is post halogenated to introduce from 0.5 to 1.5 atoms of halogen per mol of product.

* * * * *